US006983279B2

(12) United States Patent
Bianchini et al.

(10) Patent No.: US 6,983,279 B2
(45) Date of Patent: Jan. 3, 2006

(54) METHOD AND SYSTEM FOR ASSISTING A DATA PROCESSING SYSTEM USER IN BROWSING A FILE SYSTEM

(75) Inventors: Paolo Bianchini, Rome (IT); Fabrizio Loppini, Rome (IT); Furio De Nardis, Rome (IT)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 10/142,618

(22) Filed: May 9, 2002

(65) Prior Publication Data

US 2003/0115174 A1 Jun. 19, 2003

(30) Foreign Application Priority Data

Dec. 15, 2001 (GB) .................................... 0130034

(51) Int. Cl.
*G06F 17/30* (2006.01)
(52) U.S. Cl. ........................................ 707/9; 707/104.1
(58) Field of Classification Search ................................
707/1–10, 100–104.1, 200–205; 715/513–515,
715/501.1; 709/218
See application file for complete search history.

(56) References Cited

U.S. PATENT DOCUMENTS

| 6,266,681 | B1 * | 7/2001 | Guthrie ................... 715/501.1 |
| 2001/0034734 | A1 * | 10/2001 | Whitley et al. .......... 707/104.1 |
| 2002/0046257 | A1 * | 4/2002 | Killmer ..................... 709/218 |

* cited by examiner

*Primary Examiner*—Mohammad Ali
(74) *Attorney, Agent, or Firm*—Jeffrey S. LaBaw; Dillon & Yudell LLP

(57) ABSTRACT

A method and system for assisting a user of a data processing system (101) in browsing a file system (AAA-LLL,aaa-eee) by means of a browsing program (203). A browsing history database (209) is created by intercepting (205,403, 417) browsing events from the browsing program, the database including browsing starting locations (STR_LOCa–STR_LOCq) and links to associated browsing target locations (TRGT_a1–TRGT_ak, TRGT_b1–TRGT_bp,TRGT_q1,TRGT_q2) reached by the in the browsing. When the user starts a browsing, the current browsing starting location is intercepted from the browsing program. The intercepted browsing starting location is searched in the database. If the intercepted browsing starting location is found in the database, a list of links to the browsing target locations associated with the intercepted browsing starting location is retrieved from the database, and the list is proposed to the user the retrieved list of links in the form of shortcuts, which the user can activate for speedily reaching the desired browsing target location.

20 Claims, 5 Drawing Sheets

METHOD AND SYSTEM FOR ASSISTING A DATA PROCESSING SYSTEM USER IN BROWSING A FILE SYSTEM

FIELD OF INVENTION

The present invention relates generally to computer programs for exploring (browsing) a collection of information elements, and particularly to programs for exploring a hierarchical file system.

BACKGROUND OF THE INVENTION

In modern personal computers (PCs), the user can carry out the exploration of the system of directories and files (file system) stored on a mass-storage unit (such as the computer hard disk, a diskette, a CD-ROM, a DVD or a memory card) with the help of dedicated programs, normally included with the computer operating system. Examples of these exploration programs (also referred to as browsers) are the File Manager, included with Windows 3.X, and the Explorer included with Windows 9X and subsequent versions.

Such exploration programs have a graphical user interface (GUI), which allows the user interacting easily with the PC. In particular, the GUI allows the user entering commands through input devices such as the keyboard and/or the pointing device and provides to the user (on a display device) an easily comprehensible pictorial representation of the file system stored on the PC mass-storage units.

By means of these exploration programs, the PC user can view the content of a mass-storage unit, move, delete, copy, and rename files and create, view, and remove entire directories. When the PC is connected to a network of computers, such as a LAN or a WAN, these exploration programs also allow the PC user exploring file systems stored on shared mass-storage units associated with other computers of the network.

File systems can be rather complex, having several levels of directories and sub-directories. Locating a desired directory, sub-directory or file can thus be cumbersome, even with the aid of GUIs. This is especially true when the PC is part of a computer network. If the user does not remember the exact path to reach a desired directory or file, he/she might get lost in a forest of directories and sub-directories.

In order to free the user from the burden of remembering the exact paths to directories or files of interest, most exploration programs (or operating systems) include a tool by means of which the user can create bookmarks to those directories or sub-directories that he/she thinks will need to visit more or less frequently. The bookmark works as a direct link to the target directory or sub-directory, and allows the user reaching quickly the desired location in the file system by automatically run through the path to the target location.

A problem with the bookmarks is that they must be managed directly under the responsibility of the user. New bookmarks must be deliberately created by the user; obsolete bookmarks, i.e. bookmarks to locations no more of interest, or even to no more existing locations, must be deliberately deleted by the user, otherwise the number of bookmarks increases too much.

In view of the state of the art discussed, it has been an object of the present invention to provide a method for assisting a user in the exploration (browsing) of a file system.

DISCLOSURE OF THE INVENTION

In particular, an object of the present invention has been to provide a method by which a customised list of shortcuts is automatically presented to the user during a browsing activity.

Another object of the present invention has been to provide a method by which the customised list of shortcuts is created by automatically creating shortcuts to file system locations visited by the user in past browsing activities.

Another object of the present invention has been to provide a method by which the list of shortcuts presented to the user is context-sensitive, depending on the context, i.e. on the location from which the user starts a browsing.

According to the present invention, these and other objects have been attained by means of a method as set forth in appended claim 1.

In brief, a browsing history database is created by intercepting browsing events from the browsing program. The database includes browsing starting locations and links to associated browsing target locations reached by the user in his/her browsing history.

When the user starts a browsing, the intercepted current browsing starting location is searched in the database and, if the intercepted current browsing starting location is found in the database, the list of links to the browsing target locations associated with the intercepted current browsing starting location is retrieved from the database and proposed to the user in the form of shortcuts, which the user can activate for speedily reaching the desired target location.

BRIEF DESCRIPTION OF THE DRAWINGS

The features and advantages of the present invention will be made apparent by reading the following detailed description of an embodiment thereof, provided merely by way of non-limitative example and made in connection with the attached drawings, wherein.

DESCRIPTION OF THE PREFERRED EMBODIMENTS

Figure 1:
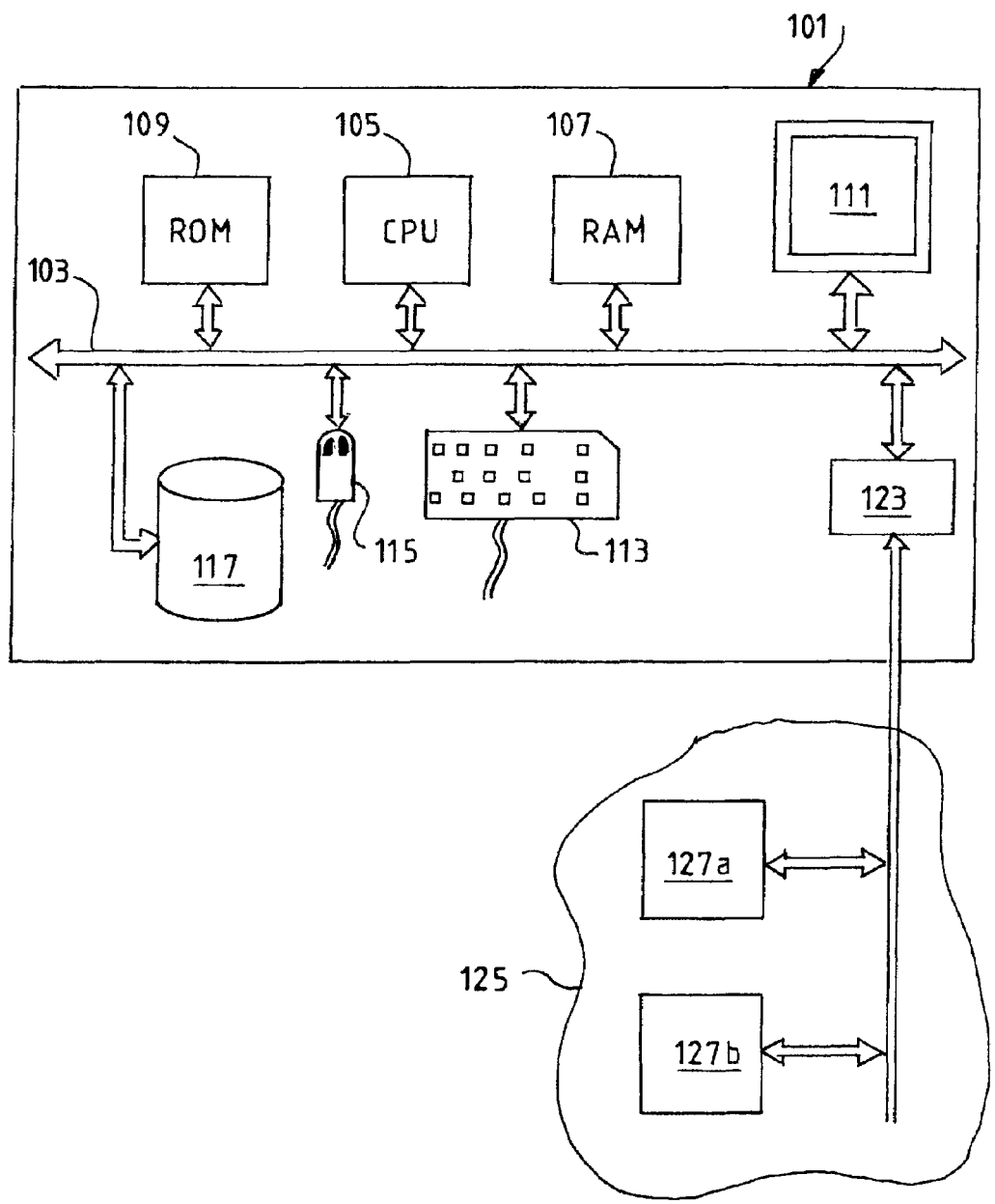
FIG. 1 schematically shows the main functional blocks of a data processing system in which the method of the present invention can be implemented.

With reference to FIG. 1, a data processing system is schematically shown in which the method according to the present invention can be implemented. The data processing system comprises a general-purpose personal computer (PC), globally indicated by 101 and depicted in terms of the main functional units. The PC 101 comprises several units connected in parallel to a data communication bus 103, for example of the PCI or USB type. In particular, a central processing unit (CPU) 105, typically comprising a microprocessor, controls the operation of the PC 101, a working memory 107, typically a RAM (Random Access Memory) is directly used by the CPU 105 for the execution of programs, and a Read Only Memory (ROM) 109 stores a basic program for the bootstrap of the PC 101. The PC 101 comprises several peripheral units, connected to the bus 103 by means of respective interfaces. Particularly, the peripheral units include peripheral units allowing the interaction with a user, such as a display device 111 (for example a CRT, LCD or plasma monitor), a keyboard 113 and a pointing device 115 (for example a mouse). The PC 101 normally has peripheral units for local mass-storage of programs and data, such as a hard-disk driver (HDD) 117 driving a magnetic hard disk; other mass-storage units may be present, such as a CD-ROM/DVD driver for reading CD-ROMs/DVDs, a floppy-disk driver for reading/writing floppy disks, a memory card reader for reading/writing memory cards. The PC 101 may be further equipped with a network interface card 123 for connecting the PC 101 to a network 125 of remote data processing systems 127*a*, 127*b*, such as a local area network (LAN) or a wide area network (WAN). The network 125 may include other PCs, server computers, CD-ROM jukeboxes and so on.

As known, programs and data take the form of files of several different types (executable files, text files, image files, audio files and so on) stored for example on the PC hard disk, on a CD-ROM, on a DVD, on a floppy disk or on a memory card. The files are normally organised in a so-called file system, including a structure of folders or directories. Most file systems are hierarchical, allowing several levels of sub-directories or sub-folders under a so-called root directory.

In PCs with modern operating systems, the PC user can explore (browse) the file systems stored on the PC hard disk (or on a CD-ROM, a DVD, a floppy disk or a memory card) with the help of dedicated programs (also referred to as browsers), such as the File Manager in Windows 3.X and the Explorer in Windows 9X and subsequent versions. Such file-system exploration programs allow the PC user viewing the contents of a mass-storage unit or group of units (such as the PC hard disk, a CD-ROM, a DVD, a floppy disk, a memory card), moving, deleting, copying, and renaming files as well as creating, viewing, and removing entire directories. When the PC is connected to a network of computers, these programs also allow the PC user exploring shared file systems stored on mass-storage units of other data processing systems of the network 125.

Figure 2:
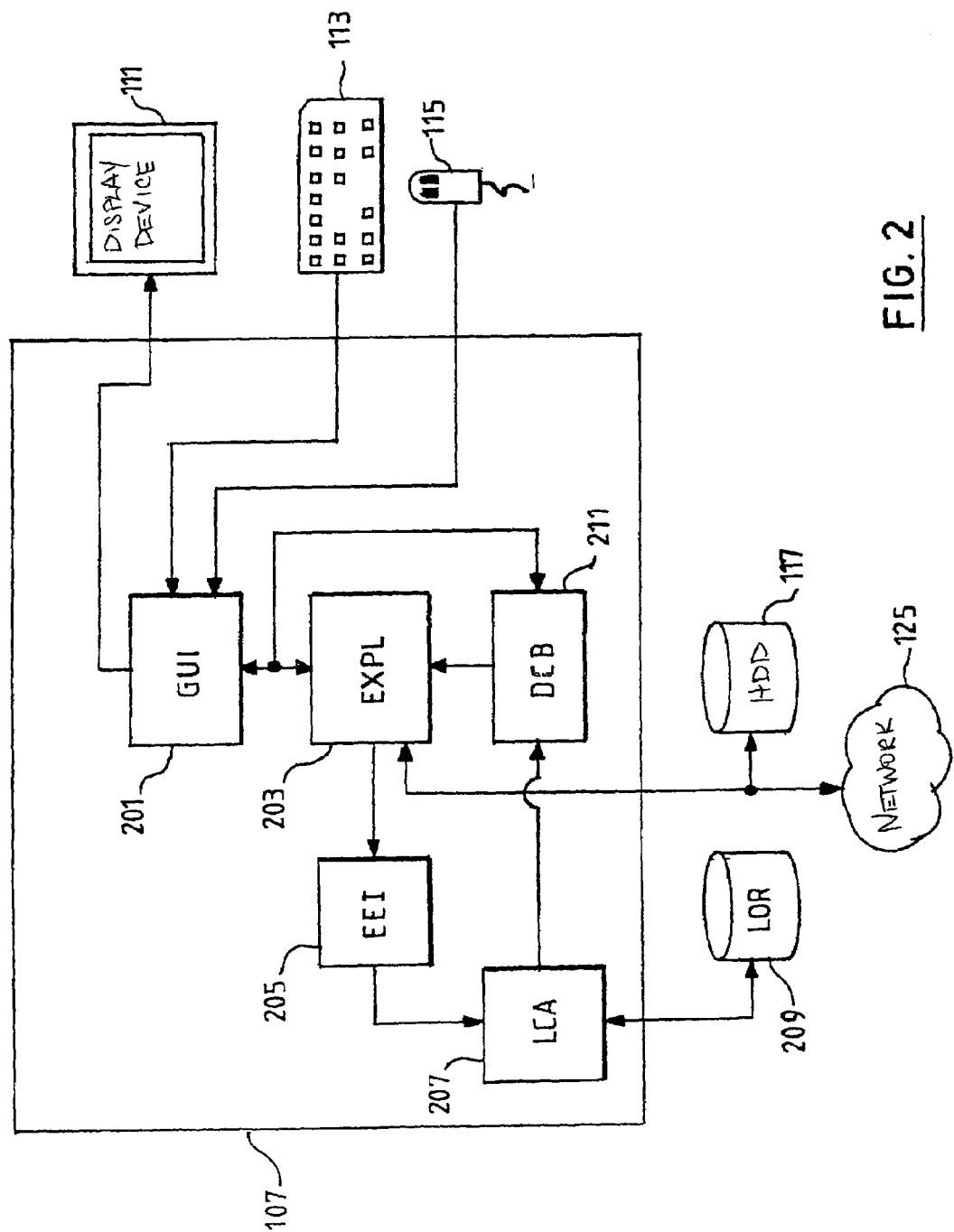
FIG. 2 schematically shows a partial content of a working memory of the data processing system of FIG. 1, while implementing a method according to an embodiment of the present invention.

FIG. 2 schematically shows a partial content of the working memory 107 of the PC 101 when the user conducts an exploration of the file system stored on a mass-storage units or group of mass-storage units, either local to the PC 101 or distributed through the network 125. The information (programs and data) is stored on the hard-disk and loaded (at least partially) into the working memory when the programs are running, together with an operating system and other application programs.

A graphical user interface (GUI) software module (in the following, shortly, GUI module) 201 allows the user interacting with the PC 101. In particular, the GUI module 201 allows the user entering commands through the keyboard 113 and/or the pointing device 115 and provides to the user (on the display device 111) an easily comprehensible pictorial representation of the file system stored on the PC mass-storage units, such as the hard disk, a floppy disk, a CD-ROM, a DVD, a memory card, as well as on mass-storage units of other data processing systems of the network 125.

The GUI software module 201 interacts with a file-system exploration software module (in the following, EXPL module) 203. The exploration module 203 interacts with the PC mass-storage units, for example the hard-disk driver 117, on which the system of directories, subdirectories and files is materially stored. The exploration module 203 interacts as well with mass-storage units of remote data processing systems of the network 125. Since the files are normally materially stored on the mass-storage units almost randomly, according to the available storage locations, and a given file is normally split in several portions materially stored in different clusters and sectors of the hard disk, the exploration module 203, using information such as the file allocation table (FAT) file, reorganizes logically the file system.

According to an embodiment of the present invention, an exploration-event interceptor software module (in the following, EEI module) 205, a link creation agent software module (in the following, LCA module) 207, a link object repository (in the following, LOR) 209 and a dynamic link browser software module (in the following, DLB module) 211 are provided.

The EEI module 205 intercepts or captures exploration events from the EXPL module 203. In particular, the EEI module monitors the EXPL module 203 to determine the actions of the user, and captures exploration events such as the start of an exploration activity by the user, the location (folder or subfolder) from which the exploration activity starts (starting location), the subsequent locations visited by the user during the exploration activity, the end of the exploration activity and the reached location (target location).

The LCA module 207 receives and manages the exploration events captured by the EEI module 205. The LCA module 207 also manages the LOR 209. As will be better explained later on, the LCA module 207 stores in the LOR the locations visited by the user in the exploration process; the visited locations are stored in the form of links to such locations. The LCA module 207 also retrieves from the LOR 209 the stored links to be proposed as shortcuts to the user so to assist him/her in the exploration activity.

The DLB module 211 receives from the LCA module 207 the links retrieved by the LCA module 207 from the LOR 209, and presents the retrieved links to the user in the form of shortcuts. The DLB module interacts with the GUI module so to present the retrieved links to the user in a pictorial, easily-comprehensible manner. In particular, the DLB module is an extension of the GUI module 201. The DLB module also interacts with the EXPL module 203, which materially performs the task of exploring the file system.

Figure 3:
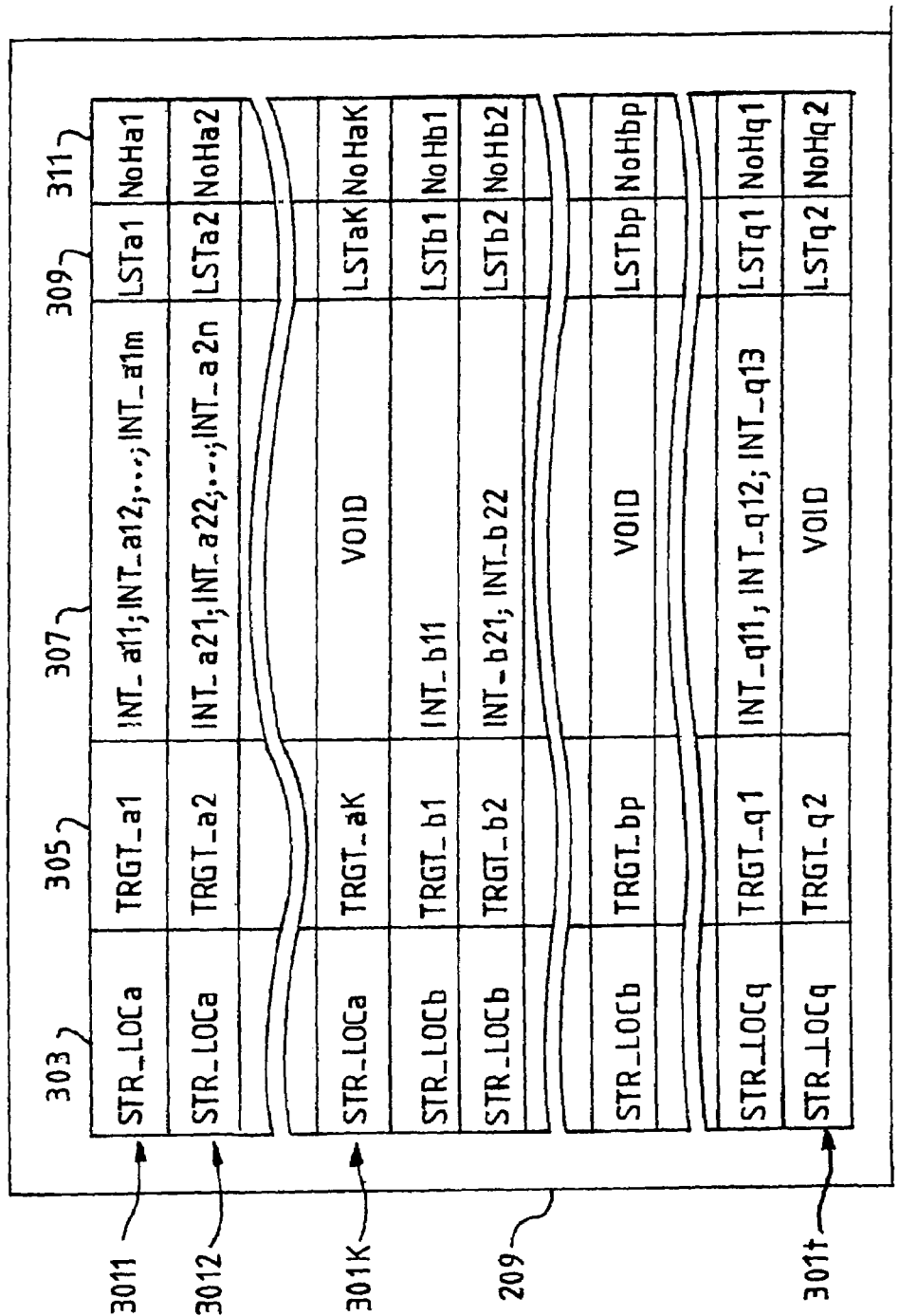
FIG. 3 is a simplified, schematic picture of a repository of links to locations visited by a user of the data processing system in previous explorations of a collection of information elements, for example a file system on a mass-storage unit.

FIG. 3 schematically depicts the content of the LOR 209. In general terms, the LOR 209 is a database in which the history of past exploration activity conducted by the user is recorded. The LOR 209 can be a file stored in a prescribed directory of the PC hard disk file system. In a network context, every user may thus have a personal LOR resident on the hard disk of the respective data processing system. Alternatively, the LOR 209 can be a distributed network database and can be unique for all the users of the network data processing systems. In particular, the LOR 209 stores a record 3011, 3012, . . . , 301*t* for each target location TRGT_a1–TRGT_ak, TRGT_b1–TRGT_bp, TRGT_q1, TRGT_q2 reached by the user in past exploration activities of the file system. In each record of the LOR 209, an index field 301 contains the exploration starting location STR_LOCa, STR_LOCb, STR_LOCq starting from which the respective target location TRGT_a1–TRGT_ak, TRGT_b1–TRGT_bp, TRGT_q1, TRGT_q2 (the links thereto being stored in a target location field 305 of the record) has been reached. The record 3011, 3012, . . . , 301*t* includes a field 307 for storing links to intermediate locations INT_a11–INT_a1m, INT_a21–INT_a2n, INT_b11, INT_b21, INT_b22, INT_q11–INT_q13 visited by the user in the course of the exploration activity from the starting location to the target location; if the target location has been reached directly from the starting location (as for example the target locations TRGT_ak, TRGT_bp, TRGT_q2) the field 307 of the respective record is left void. The record 301l, 301l, ..., 301t includes at least one additional field, storing information useful for sorting the records in the LOR 209 according to a prescribed sorting criterion. In particular, a field 309 stores information LSTa1–LSTak, LSTb1–LSTbp, LSTq1, LSTq2 adapted to determine the time of the last visit of the respective target location by the user. A field 311 stores information NoHa1–NoHak, NoHb1–NoHbp, NoHq1, NoHq2 useful for assessing the number of visits (or number of hits, in jargon) of the respective target location by the user.

Figure 4:
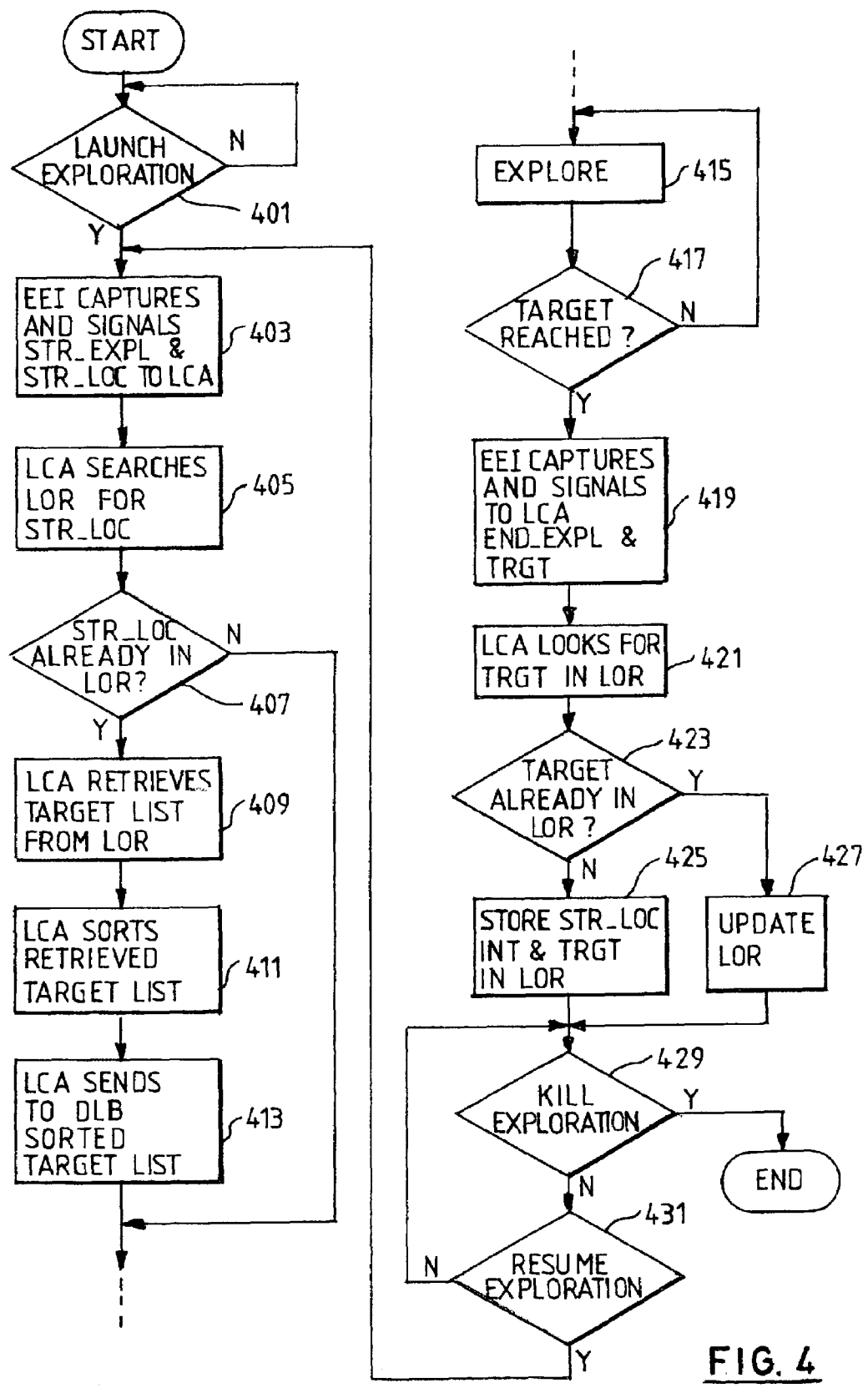
FIG. 4 is a flowchart schematically illustrating the method according to the embodiment of the present invention referred to in FIG. 2.

The operation of the system will be now described in detail making reference to the flowchart of FIG. 4.

As far as an exploration activity is concerned, the PC 101 remains in an idle loop waiting for the exploration program to be launched by the user (block 401). Clearly, while in this idle loop, the PC 101 can perform other tasks, but this is not relevant to the present invention.

When the exploration program is launched, the EEI module 205 captures this event from the EXPL module 203 (start exploration event STR_EXPL), and captures as well as the exploration starting location (STR_LOC), that is the location in the file system from which the exploration activity starts. The EEI module 205 signals to the LCA module 207 the start exploration event STR_EXPL and the exploration starting location (STR_LOC). These operations are schematically represented by block 403.

Once the LCA module 207 receives from the EEI module 205 the start exploration event STR_EXPL and the exploration starting location STR_LOC, the LCA module searches the LOR 209 (block 405) to determine if the received exploration starting location STR_LOC is already present in the repository 209 (block 407). In particular, the LCA module 207 searches the received exploration starting location STR_LOC in the index field 303 of the records 301l–301t of the LOR 209.

If the exploration starting location is found in the LOR 209 (branch "Y" of block 407), the LCA module 207 retrieves from the LOR 209 all the records having that starting location in the respective index field 303 (block 409). For example, assuming that the exploration starting location is the starting location STR_LOCa, the LCA module 207 retrieves from the LOR 209 all the records 301l to 301k.

Then, the LCA module 207 sorts the retrieved records (block 411). The sorting is conducted on the basis of the information stored in the fields 309 and 311 of the retrieved records. In particular, the retrieved records are sorted first on the basis of the information stored in the respective field 311, indicating the number of hits for the respective target location, i.e. the number of visits to that target location in past exploration activities: target locations having a higher number of hits are assigned a higher ranking than target locations having a lower number of hits. If two or more target locations have a same number of hits, they are sorted on the basis of the information stored in the field 309 of the respective record: the LCA module 207 determines the target locations visited more recently by the user, and ranks the target locations following a more-recently-visited criterion. Other sorting criteria can be adopted. For example, the retrieved records can be ranked first on a more-recently-visited basis, and then on the basis of the number of hits to the target locations.

After having sorted the retrieved list of target locations, the LCA module 207 sends the sorted retrieved records, and thus the sorted list of target location links to the DLB module 211 (block 413). Through the GUI module 201, the DLB module 211 presents to the user a corresponding sorted list of shortcuts to the target locations which, in past explorations, have been reached starting from the current exploration starting location, ranked according to the prescribed sorting criterion.

Preferably, not only the shortcuts to the target locations visited in the past, but also shortcuts to intermediate locations visited in the course of past exploration activities before reaching the target locations are presented to the user. For example, assuming again that the exploration activity starts from the starting location STR_LOCa, the DLB module 211 presents to the user not only the shortcuts to the target locations TRGT_a1, TRGT_a2, ..., TRGR_ak, but also shortcuts to the intermediate locations INT_a11, INT_a12, ..., INT_a1m visited in a past exploration activity to reach the target location TRGT_a1, and shortcuts to the intermediate location INT_a21, INT_a22, ..., INT_a2n visited in a past exploration to reach the target location TRGT_a2.

The number of shortcuts presented to the user may be limited to a sub-set of the retrieved target locations, starting from the one ranked first.

The user then explores the file system (block 415); the exploration is conducted by the user either relying on the conventional commands accepted by the EXPL module 203, or by selecting the shortcuts presented to the user by the DLB module and visualised pictorially on the display device 111 by the GUI module 201. In both cases, the user interacts with the GUI module by means of the keyboard 113 or the pointing device 115.

If the exploration starting location signalled to the LCA module 207 by the EEI module 205 is not found in the LOR 209 (branch "N" of block 407), the operations schematised by blocks 409 to 413 are not performed, and no shortcuts are presented to the user, because there is no previous history for explorations starting from that starting location. In this case, the user only relies on the conventional commands accepted by the EXPL module 203 for performing the exploration.

The user continues to explore the file system until a target location is reached (block 417). During the exploration, the EEI module 205 constantly monitors the EXPL module 203 and keeps track of the intermediate locations visited by the user before reaching the target location.

When the EEI module 205 detects that the exploration is terminated (capturing from the EXPL module 203 an end exploration event END_EXPL) and the user has reached a target location TRGT, the EEI module 205 signals to the LCA module 207 the END_EXPL event, the reached target location TRGT and the intermediate locations visited before reaching the target location (block 419). The END_EXPL event can for example be triggered by the opening of a file (such as a document file or an image file) stored in the last reached location (directory), or by launching a program stored in the last reached location. The end exploration event END_EXPL can also be triggered by a stop in the last reached location for more than a prescribed time (for example, of the order of some seconds), or by the creation by the user of a bookmark to the last reached location.

When the LCA module 207 receives from the EEI module 205 the indication of the END_EXPL event, the LCA module 207 looks through the LOR 209 (block 421) to find if a record already exists for the target location TRGT (block 423). If no record exists in the LOR 209 for the target location TRGT (branch "N" of block 423), the LCA module 207 creates a new record in the LOR 209, and stores in the new record a link to the target location TRGT (in the record field 305), a link to the exploration starting location STR_LOC from which the exploration has started (in the record field 303) and links to the intermediate locations visited by the user before reaching the target location TRGT, if any (in the record field 307) (block 425). Additionally, the LCA module 207 stores in the new LOR record the time and date the target location has been reached (in the record field 309) and sets a numeric value "1" in the record field 311 indicating the number of hits for that target location. Something similar takes place if a record containing the target location TRGT is found in the LOR 209, but the starting location associated with the already existing record differs from the starting location from which the target location has been reached in the course of the present exploration activity: in this case, a new record can be created, with a link to the different starting location in the index field 303. Alternatively, each LOR record 301l–301t can include more than one field 303, for storing multiple links to multiple starting locations, and more than one field 307 for storing multiple series of links to intermediate locations: in this case, if the LCA module 207 finds the target location in the LOR, the LCA module checks whether the current starting location coincides with the one already stored for the target location and, in the negative case, adds the new starting location to the record. Also, links to the intermediate locations visited in the course of the present exploration activity are stored.

If the target location TRGT is already stored in a record of the LOR 209, the LCA module 207 updates the respective record (block 427), increasing the number of hits (the record field 311) and updating the record field 309 containing the information on the last time the target location has been visited. Optionally, the LCA module 207 can also sort the records relating to a given starting location, according to the prescribed sorting criterion. In this way, the next time the list of target locations reached from a given starting location needs to be retrieved from the LOR 209, such a list is already sorted and the links properly ranked.

Subsequently, if the exploration program is killed (branch "Y" of block 429), the process ends. Otherwise, the exploration activity is only suspended. The system checks whether the exploration is resumed (block 431): in the negative case, the system jumps back to block 429, and remains in an idle loop waiting for the exploration process to be definitively killed or resumed. When the exploration process is resumed, the system jumps back to block 403. The resuming of the exploration activity is detected by the EEI module 205, capturing events such as the interaction of the user with the GUI module 201. The file system location from which the exploration is resumed will become the new starting location for the new exploration activity.

Figure 5:
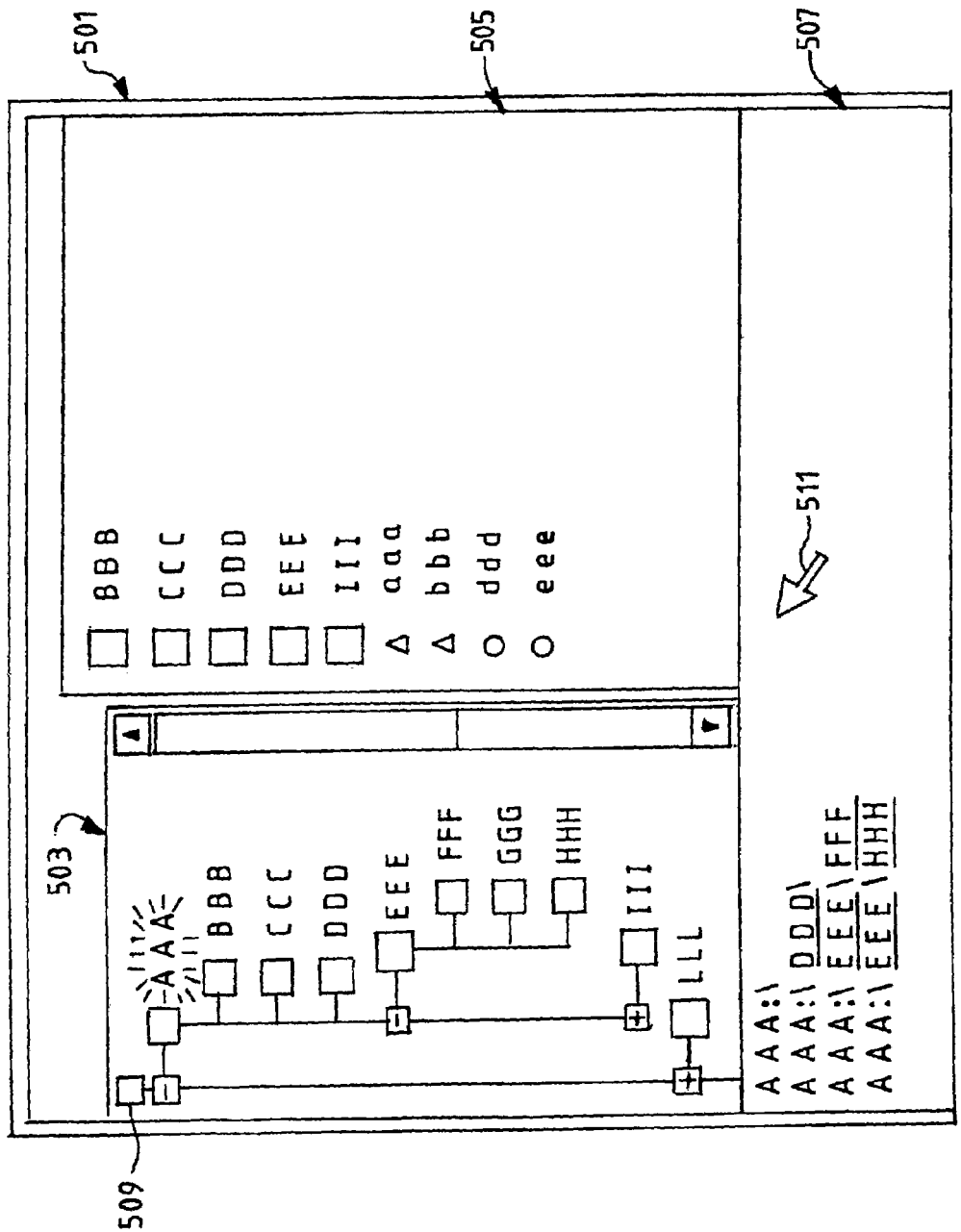
FIG. 5 is a pictorial representation of a graphic user interface window presented to the user during an exploration.

FIG. 5 is a pictorial representation of an exploration window 501 presented to the user on the display device 111 by the GUI module 201. The window 501 comprises three frames 503, 505, 507. In the frame 503, a hierarchical file system (for example, the file system on the PC hard disk) is presented to the user in the form of a tree, with a root folder 509. By way of example only, let it be assumed that two first-level sub-folders AAA, LLL exist under the root 509. Under the first-level sub-folder AAA, which is shown expanded, five second-level subfolders BBB, CCC, DDD, EEE and III are present. In turn, three third-level sub-folders exist under the second-level subfolder EEE. In the frame 505, the elements contained in the currently selected folder or sub-folder. In the shown example, the first-level sub-folder AAA is assumed to be selected, so that in the frame 505 the five second-level sub-folders BBB, CCC, DDD, EEE, III under the sub-folder AAA are shown. In addition, files aaa, bbb, ddd, eee stored directly in the sub-folder AAA are shown. In order to select a folder or sub-folder in the frame 503, the user can use the pointing device 115: the current position within the window 501 is typically indicated by a graphic pointer 511. A given folder or sub-folder can be selected and opened by positioning the pointer 511 thereover and, e.g., clicking a button of the pointing device 115. A given sub-folder can be selected and opened both from the frame 503 and from the frame 505. A given file in a folder or sub-folder can be selected and opened from the frame 505 by positioning thereover the pointer 511 and, e.g., double-clicking the button of the pointing device 115.

The frame 507 is used to present to the user the sorted list of shortcuts associated with the currently selected folder or sub-folder. As described previously, such a list is retrieved by the LCA module 207 from the LOR 209, and is passed to the DLB module 211. In the shown example it is assumed that the currently selected folder is the folder AAA (the exploration starting location). A list of four shortcuts is presented to the user in the frame 507: a first shortcut (AAA:\) works as a direct link to the sub-folder AAA, a second shortcut (AAA\:DDD\) works as a direct link to the sub-folder DDD, a third shortcut (AAA:\EEE\FFF) works as a direct link to the sub-folder FFF, a fourth shortcut (AAA:\EEE\HHH) works as a direct link to the sub-folder HHH. These four shortcuts are retrieved by the LCA module 207 from the LOR 209, and are intended as suggestions presented to the user on the basis of the past exploration history. In particular, the presence of the four shortcuts in the frame 507 means that in previous exploration activities starting from the sub-folder AAA, the user has once, or more than once, stopped the exploration after reaching the sub-folder AAA, has reached once or more than once the sub-folder DDD, has reached once or more than once the sub-folder FFF and has reached once or more than once the sub-folder HHH. Concerning the last two shortcuts of the list, also the intermediate locations (the sub-folder EEE) visited by the user before reaching the target locations are shown. By using the pointing device 115, the user can select any one of the shortcuts to the target locations presented in the frame 507, as well as any one of the shortcuts to the intermediate locations.

The described method and system allows generating dynamic context-sensitive exploration shortcuts for assisting a user during the exploration activity, and for speeding up such an activity.

In particular, the list of shortcuts to be presented to the user is automatically generated, is not static as the bookmarks created by the user and needs not be maintained by the user, but evolves taking into account the user's exploration actions.

Thanks to the method according to the present invention, a user is greatly assisted in the activity of exploration of a collection of information resources. Bookmarks to target locations visited by the user in past exploration activities are created, managed and proposed to the user automatically.

What is claimed is:

1. A method for assisting a user of a data processing system in browsing a file system by means of a browsing program, the method comprising:

creating a browsing history database by intercepting browsing events from the browsing program, the browsing history database including browsing starting locations and links to associated browsing target locations reached by the user in the browsing;

when the user starts a browsing:

intercepting from the browsing program a current browsing starting location;

searching the intercepted browsing starting location in the database;

if the intercepted browsing starting location is found in the database, retrieving from the database a list of links to the browsing target locations associated with the intercepted browsing starting location, and proposing to the user the retrieved list of links in the form of shortcuts, which the user can activate for speedily reaching the desired browsing target location.

2. The method according to claim 1, in which said proposing to the user shortcuts comprises:

retrieving from the database the stored browsing target location links associated with the intercepted browsing starting location, and sorting the retrieved browsing target location links according to a prescribed criterion.

3. The method according to claim 2, in which said creating the database comprises:

providing for each browsing target location link stored in the database an indication of relevance of the browsing target location, and updating the indication of relevance each time the browsing target location is reached by the user in the browsing, and in which said sorting the retrieved browsing target location links comprises using the indication of relevance of the retrieved browsing target locations.

4. The method according to claim 3, in which said indication of relevance comprises an indication of a number of visits to the browsing target location by the user.

5. The method according to claim 4, in which said sorting the retrieved browsing target location links comprises ranking the retrieved browsing target locations in decreasing order of number of visits.

6. The method according to claim 3, in which said indication of relevance comprises an indication of a time of last visit to the browsing target location by the user.

7. The method according to claim 6, in which said sorting the retrieved browsing target location links comprises ranking the retrieved browsing target location links in reverse chronological order of time of last visit.

8. The method according to claim 1, in which:

said intercepting browsing events comprises intercepting browsing intermediate locations visited by the user before reaching the browsing target location;

said creating the database comprises storing, in association with each browsing target location link, links to the intercepted browsing intermediate locations, and said proposing to the user shortcuts to the browsing target locations comprises proposing to the user shortcuts to the browsing intermediate locations associated with the browsing target locations.

9. A system for assisting a user of a data processing system in browsing a file system, the system comprising:

a browsing event interceptor program module for intercepting browsing events from a browsing program module interacting with the file system, the browsing event interceptor program module intercepting at least a browsing starting location and a browsing target location;

a browsing history database of browsing starting locations and links to associated browsing target locations obtained from past browsing activities by the user;

a browsing history database manager program module for managing the database according to the browsing events intercepted by the browsing event interceptor program module, said database manager program module:

managing the storage in the database of browsing starting locations and links to associated browsing target locations intercepted by the browsing event interceptor program module;

retrieving from the database stored browsing target location links associated with an intercepted browsing starting location intercepted in a current browsing;

proposing to the user, through a user interface program module allowing the user to interact with the browsing program module through input/output devices of the data processing system, a list of shortcuts to the retrieved browsing target locations.

10. The system according to claim 9, in which the database manager program module sorts the retrieved browsing target location links according to a prescribed criterion.

11. The system according to claim 10, in which said database comprises, for each browsing target location link stored, an indication of relevance of the browsing target location, the database manager program module updating the indication of relevance each time the browsing target location is reached by the user in the browsing, and in which the database manager program module sorts the retrieved browsing target location links using the respective indication of relevance.

12. The system according to claim 11, in which said indication of relevance comprises an indication of a number of visits to the browsing target location by the user.

13. The system according to claim 12, in which the database manager program module sorts the retrieved browsing target location links ranking the retrieved browsing target location links in decreasing order of number of visits.

14. The system according to claim 11, in which said indication of relevance comprises an indication of a time of last visit to the browsing target location by the user.

15. The system according to claim 14, in which the database manager program module sorts the retrieved browsing target location links ranking the retrieved browsing target location links in reverse chronological order of time of last visit.

16. The system according to claim 9, in which:

the browsing event interceptor program module intercepts from the browsing program module browsing intermediate locations visited by the user before reaching the browsing target location;

the database manager program module stores, in association with each browsing target location link, links to the intercepted browsing intermediate locations received from the browsing event interceptor program module, and the database manager program module proposes to the user, together with shortcuts to the browsing target locations, shortcuts to the browsing intermediate locations associated with the browsing target locations.

17. The system according to claim 9, in which the data processing system is part of a network of data processing systems, the database being a network distributed database serving the users of the data processing systems of the network.

18. A system for assisting a user of a data processing system in browsing a file system, the system comprising:
- means for intercepting browsing events from a browsing program module interacting with the file system, the browsing event intercepting means intercepting at least a browsing starting location and a browsing target location;
- a database of browsing starting locations and links to associated browsing target locations obtained from past browsing by the user;
- means for managing the database according to the browsing events intercepted by the browsing event interceptor program module, said database managing means:
- managing the storage in the database of browsing starting locations and links to associated browsing target locations intercepted by the browsing event intercepting means;
- retrieving from the database stored browsing target location links associated with an intercepted browsing starting location intercepted in a current browsing;
- proposing to the user, through a user interface program module allowing the user to interact with the browsing program module through input/output devices of the data processing system, a list of shortcuts to the retrieved browsing target locations.

19. A system for browsing a file system, the system comprising:
- a browsing program module interacting with the file system;
- a browsing event interceptor program module for intercepting browsing events from the browsing program module, the browsing event interceptor program module intercepting at least a browsing starting location and a browsing target location;
- a database of browsing starting locations and links to associated browsing target locations obtained from past browsing activities by the user;
- a browsing history database manager program module for managing the database according to the browsing events intercepted by the browsing event interceptor program module, said database manager program module:
- managing the storage in the database of browsing starting locations and links to associated browsing target locations intercepted by the browsing event interceptor program module;
- retrieving from the database stored browsing target location links associated with an intercepted browsing starting location intercepted in a current browsing;
- proposing to the user a list of shortcuts to the retrieved browsing target locations.

20. A computer program product stored on a computer usable medium, comprising computer readable program means for causing a computer to perform a method for assisting a user of a data processing system in browsing a file system by means of a browsing program, the method comprising:
- creating a browsing history database by intercepting browsing events from the browsing program, the browsing history database including browsing starting locations and links to associated browsing target locations reached by the user in the browsing;
- when the user starts a browsing:
- intercepting from the browsing program a current browsing starting location searching the intercepted browsing starting location in the database;
- if the intercepted browsing starting location is found in the database, retrieving from the database a list of links to the browsing target locations associated with the intercepted browsing starting location, and proposing to the user the retrieved list of links in the form of shortcuts, which the user can activate for speedily reaching the desired browsing target location.

* * * * *